US008258667B2

(12) United States Patent
Goda

(10) Patent No.: US 8,258,667 B2
(45) Date of Patent: Sep. 4, 2012

(54) REVERSE ELECTROMOTIVE FORCE GENERATING MOTOR

(76) Inventor: Toshio Goda, Ibaraki (JP)

( * ) Notice: Subject to any disclaimer, the term of this patent is extended or adjusted under 35 U.S.C. 154(b) by 0 days.

(21) Appl. No.: 13/015,691

(22) Filed: Jan. 28, 2011

(65) Prior Publication Data

US 2011/0187220 A1    Aug. 4, 2011

(30) Foreign Application Priority Data

Feb. 2, 2010    (JP) .................................. 2010-021688

(51) Int. Cl.
*H02K 3/00*    (2006.01)
(52) U.S. Cl. ........................................ 310/198; 310/184
(58) Field of Classification Search .................. 310/179, 310/184, 198, 200, 202, 205
See application file for complete search history.

(56) References Cited

U.S. PATENT DOCUMENTS 6,359,366 B1 *   3/2002   Liang et al. .................... 310/263
6,998,750 B2 *   2/2006   Anma et al. ................... 310/198

* cited by examiner

*Primary Examiner* — Dang Le
(74) *Attorney, Agent, or Firm* — Kubotera & Associates, LLC

(57) ABSTRACT

A reverse electromotive force generating motor includes a stator yoke; a rotor disposed in the stator yoke; a first coil disposed in the stator yoke and connected to a first input line of a power source with a first phase; a second coil disposed in the stator yoke and connected to the first coil in series, said second coil being connected to a first neutral point; a third coil disposed in the stator yoke and connected to the first neutral point; a fourth coil disposed in the stator yoke and connected to the third coil in series, said fourth coil being connected to a first output line for outputting power; and a rotational shaft disposed in the rotor.

11 Claims, 12 Drawing Sheets

Coils 101, 201, 301, 401, 103, 203, 303, 403

Coils 102, 202, 302, 402

Coils 101, 201, 301, 401, 501, 601, 103, 203, 303, 403, 503, 603

Coils 102, 202, 302, 402, 502, 602

REVERSE ELECTROMOTIVE FORCE GENERATING MOTOR

BACKGROUND OF THE INVENTION AND RELATED ART STATEMENT

The present invention relates to a reverse electromotive force generating motor having both a function of a power motor and a function of an electric generator.

When a conventional reverse electromotive force generating motor has a function of a power motor and a function of an electric generator, the conventional reverse electromotive force generating motor tends to be capable of generating only a small rotational force.

In view of the problems described above, an object of the present invention is to provide a reverse electromotive force generating motor functioning as both a motor and an electric generator. The reverse electromotive force generating motor is capable of generating a large rotational force, thereby resolving the problems described above.

Further objects and advantages of the invention will be apparent from the following description of the invention.

SUMMARY OF THE INVENTION

In order to attain the objects described above, according to the present invention, a reverse electromotive force generating motor includes a stator yoke; a rotor disposed in the stator yoke; a first coil disposed in the stator yoke and connected to a first input line of a power source with a first phase; a second coil disposed in the stator yoke and connected to the first coil in series, said second coil being connected to a first neutral point; a third coil disposed in the stator yoke and connected to the first neutral point; a fourth coil disposed in the stator yoke and connected to the third coil in series, said fourth coil being connected to a first output line for outputting power; and a rotational shaft disposed in the rotor.

DETAILED DESCRIPTION OF THE PREFERRED EMBODIMENTS

Hereunder, embodiments of the present invention will be explained with reference to the accompanying drawing. In the embodiment, in a reverse electromotive force generating motor of the invention, a plurality of coils is disposed in a yoke. The coils are connected to an input line for rotating the motor, and are connected to an output line for generating power. In order to separate the two functions of the coils, an end line of one coil is connected to a neutral point.

In the embodiment, the input line and the output line are drawn to an input terminal stage and an output terminal stage, respectively, arranged outside the reverse electromotive force generating motor. The neutral point of the input pine is connected with delta connection on an input terminal stage, and the neutral point of the output pine is connected with start connection or delta connection on an output terminal stage.

First Embodiment

Figure 1:
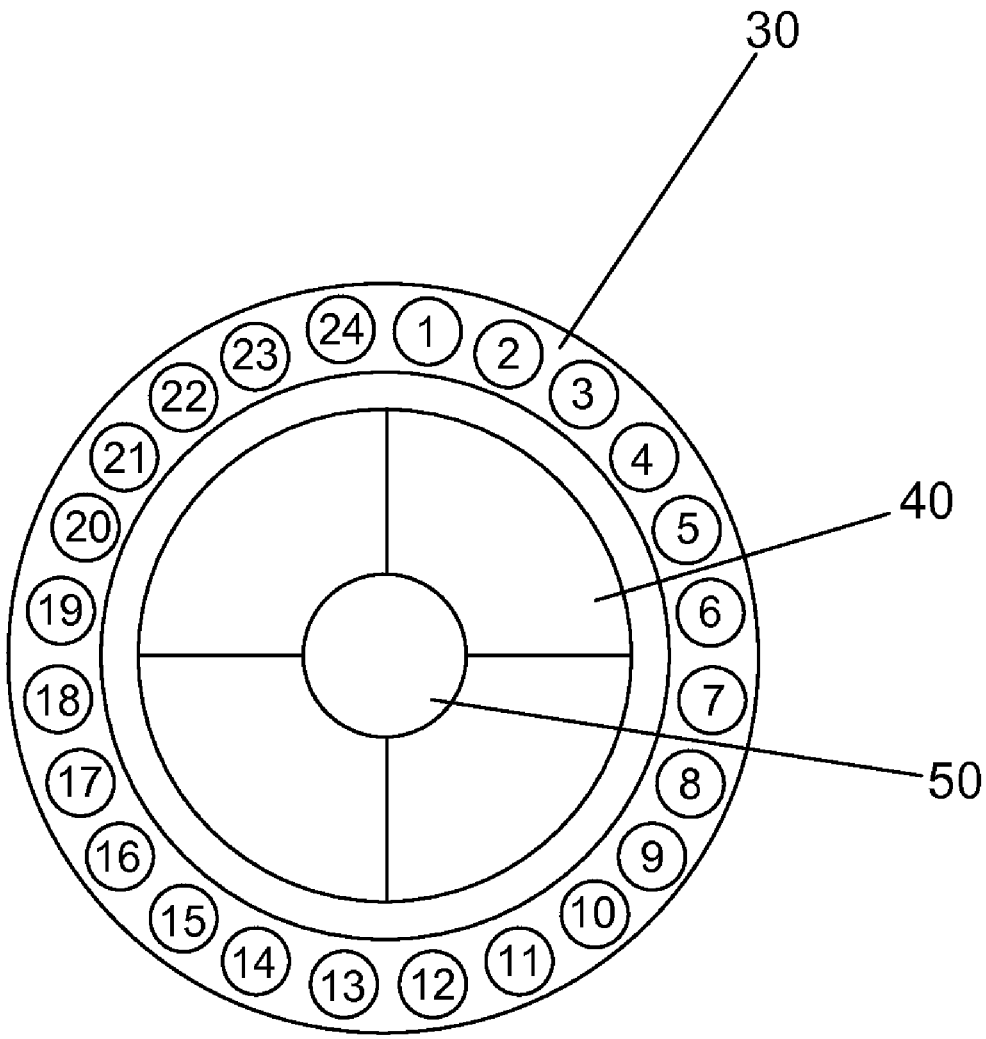
FIG. 1 is a sectional view showing a reverse electromotive force generating motor according to a first embodiment of the present invention.

A first embodiment of the present invention will be explained. FIG. 1 is a sectional view showing a reverse electromotive force generating motor according to the first embodiment of the present invention.

As shown in FIG. 1, the reverse electromotive force generating motor includes a stator yoke 30; a rotor 40 disposed in the stator yoke 30; and a rotational shaft 50 disposed in the rotor 40.

As shown in FIG. 1, the stator yoke 30 has a plurality of slots 1 to 24 (twenty four slots in the embodiment) as hollow portions. A plurality of coils 101 to 103, 201 to 203, 301 to 303, and 401 to 403 (described later) is arranged in the slots 1 to 24 for generating an electromotive force around the stator yoke 30, so that the rotor 40 is attracted and rotates around the rotational shaft 50.

Figure 2:
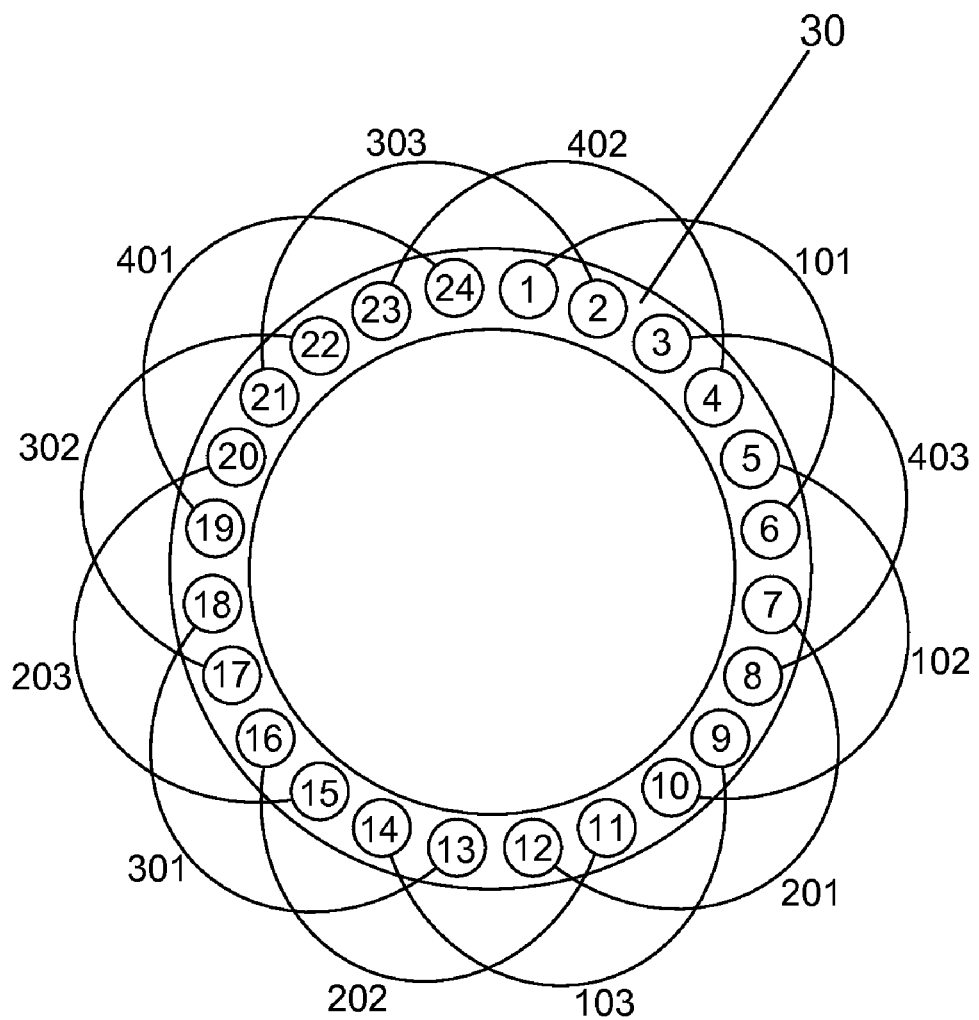
FIG. 2 is a sectional view showing a stator yoke of the reverse electromotive force generating motor according to the first embodiment of the present invention.

FIG. 2 is a sectional view showing the stator yoke 30 of the reverse electromotive force generating motor according to the embodiment of the present invention. The stator yoke 30 is a four-pole type, and an arrangement of the coils 101 to 103, 201 to 203, 301 to 303, and 401 to 403 will be explained below.

As shown in FIGS. 1 and 2, the stator yoke 30 is a four-pole type, and has twenty four slots for winding the coils 101 to 103, 201 to 203, 301 to 303, and 401 to 403. Alternatively, the stator yoke 30 may have forty eight slots. When a stator yoke is a six-pole type, the stator yoke may have thirty six slots or seventy two slots.

In the embodiment, the coils 101 to 103, 201 to 203, 301 to 303, and 401 to 403 are arranged in the slots 1 to 24 as follows. The coil 101 is disposed in the slots 1 and 6, and is connected to an input line of a first phase. The coil 301 is disposed in the slots 13 and 18, and is connected to the coil 101 in series. The coil 201 is disposed in the slots 7 and 12, and is connected to a neutral point. The coil 401 is disposed in the slots 19 and 24, and is connected an output line of the first phase. The coil 401 is connected to the coil 201 in series.

In the embodiment, the coil 102 is disposed in the slots 5 and 10, and is connected to an input line of a second phase.

The coil 302 is disposed in the slots 17 and 22, and is connected to the coil 102 in series. The coil 202 is disposed in the slots 11 and 16, and is connected to a neutral point. The coil 402 is disposed in the slots 23 and 4, and is connected to the coil 202 in series. The coil 402 is connected to an output line of the second phase.

Figure 3:
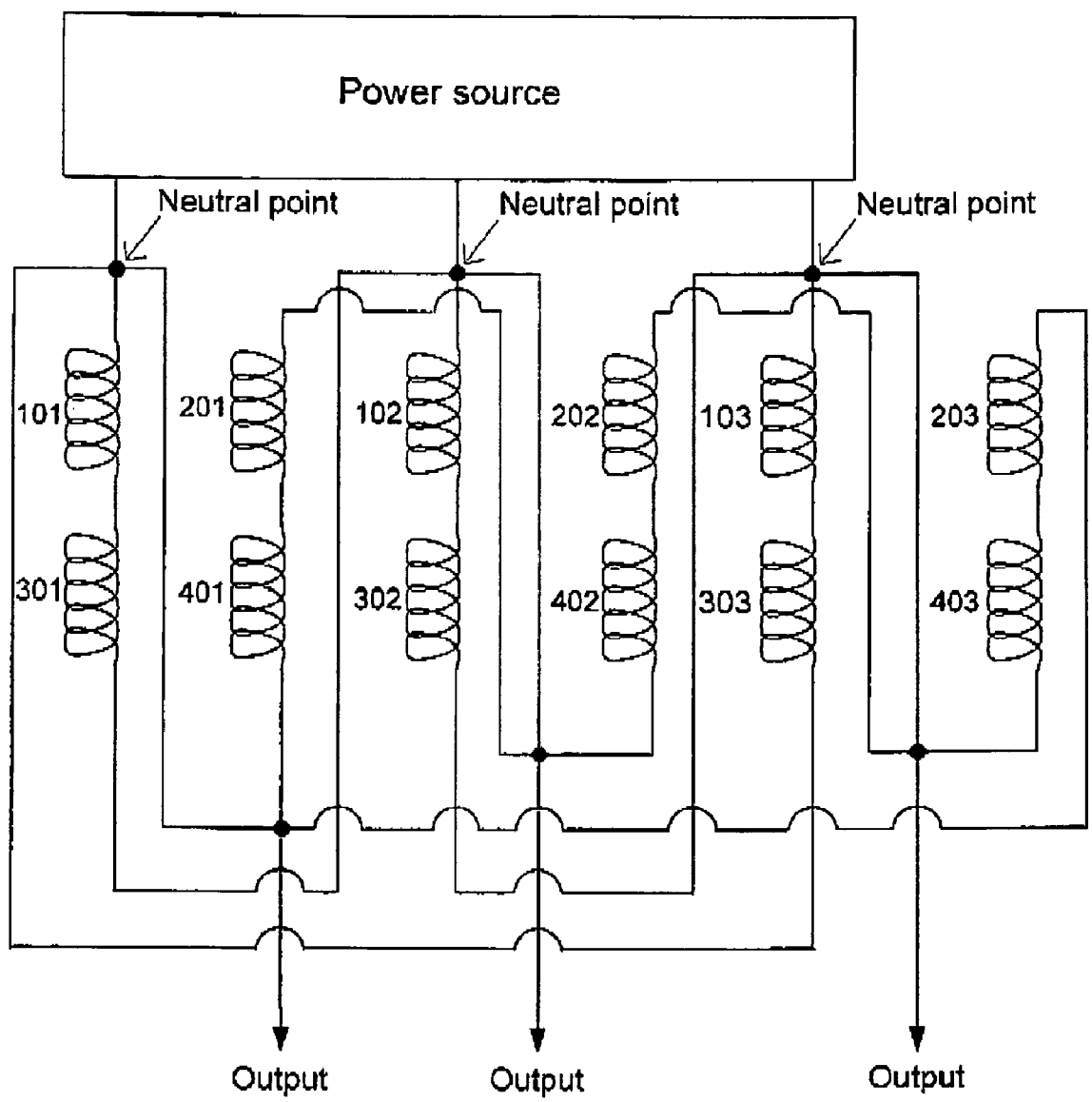
FIG. 3 is a circuit diagram of the reverse electromotive force generating motor according to the first embodiment of the present invention.

In the embodiment, the coil 103 is disposed in the slots 9 and 14, and is connected to an input line of a third phase. The coil 303 is disposed in the slots 21 and 2, and is connected to the coil 103 in series. The coil 203 is disposed in the slots 15 and 20, and is connected to a neutral point. The coil 403 is disposed in the slots 3 and 8, and is connected to the coil 203 in series. The coil 403 is connected to an output line of the third phase In the embodiment, the coils 101 to 103, 201 to 203, 301 to 303, and 401 to 403 are connected as follows. FIG. 3 is a circuit diagram of the reverse electromotive force generating motor according to the first embodiment of the present invention.

As shown in FIG. 3, a power source has three input lines of three phases. The input line of the first phase is connected to the coil 101, and the coil 101 is connected to the coil 301 in series. The input line of the second phase is connected to the coil 102, and the coil 102 is connected to the coil 302 in series. The input line of the third phase is connected to the coil 103, and the coil 103 is connected to the coil 303 in series. The coils 301, 302, and 303 are connected at the neutral points.

Further, in the embodiment, three output lines are connected to the neutral points. The output line of the first phase is connected to the coil 401, and the coil 201 is connected to the coil 401 in series. The output line of the second phase is connected to the coil 402, and the coil 202 is connected to the coil 402 in series. The output line of the third phase is connected to the coil 403, and the coil 203 is connected to the coil 403 in series.

Further, in the embodiment, the coils 101 to 103, 201 to 203, 301 to 303, and 401 to 403 are wound in a specific direction. More specifically, the coils 101 to 103, 201 to 203, 301 to 303, and 401 to 403 are wound in a same direction (e.g., a right direction) with respect to a radial line of the stator yoke 30.

An operation of the reverse electromotive force generating motor will be explained. In the following description, the first phase line of the reverse electromotive force generating motor of the four-pole type will be explained as an example. The second and the third phase lines rotate and generate electric power in the same way.

In the embodiment, the input terminal stage and the output terminal stage are disposed outside the reverse electromotive force generating motor. The input lines are fixed to the input terminal state with bolts and nuts. The input terminal stage and the output terminal stage are formed of an insulation material such as plastic.

After the input lines of the three phases are fixed on the input terminal stage, the neutral lines are connected to the input lines with delta connection. More specifically, the neutral line of the first phase is connected to the input line of the second phase; the neutral line of the second phase is connected to the input line of the third phase, and the neutral line of the third phase is connected to the input line of the first phase.

Similarly, the output lines of the three phases are fixed on the output terminal stage. Then, the output lines of the three phases are connected together with star connection. Alternatively, the output lines of the three phases are connected with delta connection. More specifically, the neutral line of the first phase is connected to the output line of the second phase; the neutral line of the second phase is connected to the output line of the third phase, and the neutral line of the third phase is connected to the output line of the first phase.

The reverse electromotive force generating motor rotates with a three-phase alternate current of, for example, 200 V. A magnetic field is generated at the coils 101, 201, 301, and 401 in the first phase line. When the rotor 40 includes an iron core and permanent magnets embedded in the iron core, the magnetic field thus generated attracts the permanent magnets, thereby rotating the rotor 40. Alternatively, the rotor 40 may be formed of an electric magnet.

More specifically, the coil 101 and the coil 301 in the first phase line generate the magnetic field of an S pole in the stator yoke 30, and the coil 201 and the coil 401 in the first phase line generate the magnetic field of an N pole in the stator yoke 30.

When a voltage applied to the coil 101 and the coil 301 in the first phase line becomes zero, the coil 102 and the coli 302 in the second phase line generate the magnetic field of the S pole. Further, the coil 202 and the coil 402 in the second phase line generate the magnetic field of the N pole. Accordingly, the permanent magnets of the rotor 40 are attracted to the magnetic field, thereby rotating the rotor 40.

When the rotor 40 rotates as described above, a magnetic flux of the N pole traverses the coil 101 and the coil 301, thereby generating the reverse electromotive force. At the same time, a magnetic flux of the S pole traverses the coil 201 and the coil 401, thereby generating the electromotive force. At this moment, a reverse electromotive current flows toward the input line, and an electromotive current flows toward the output line.

In the embodiment, the reverse electromotive current eventually flows toward the output line as an alternate current reverse current. As a result, it is possible to generate alternate current power.

Second Embodiment

A second embodiment of the present invention will be explained next. In the second embodiment, the coils 101 to 103, 201 to 203, 301 to 303, and 401 to 403 are arranged in the slots 1 to 24 of the stator yoke 30 in a different way from that in the first embodiment.

Figure 4:
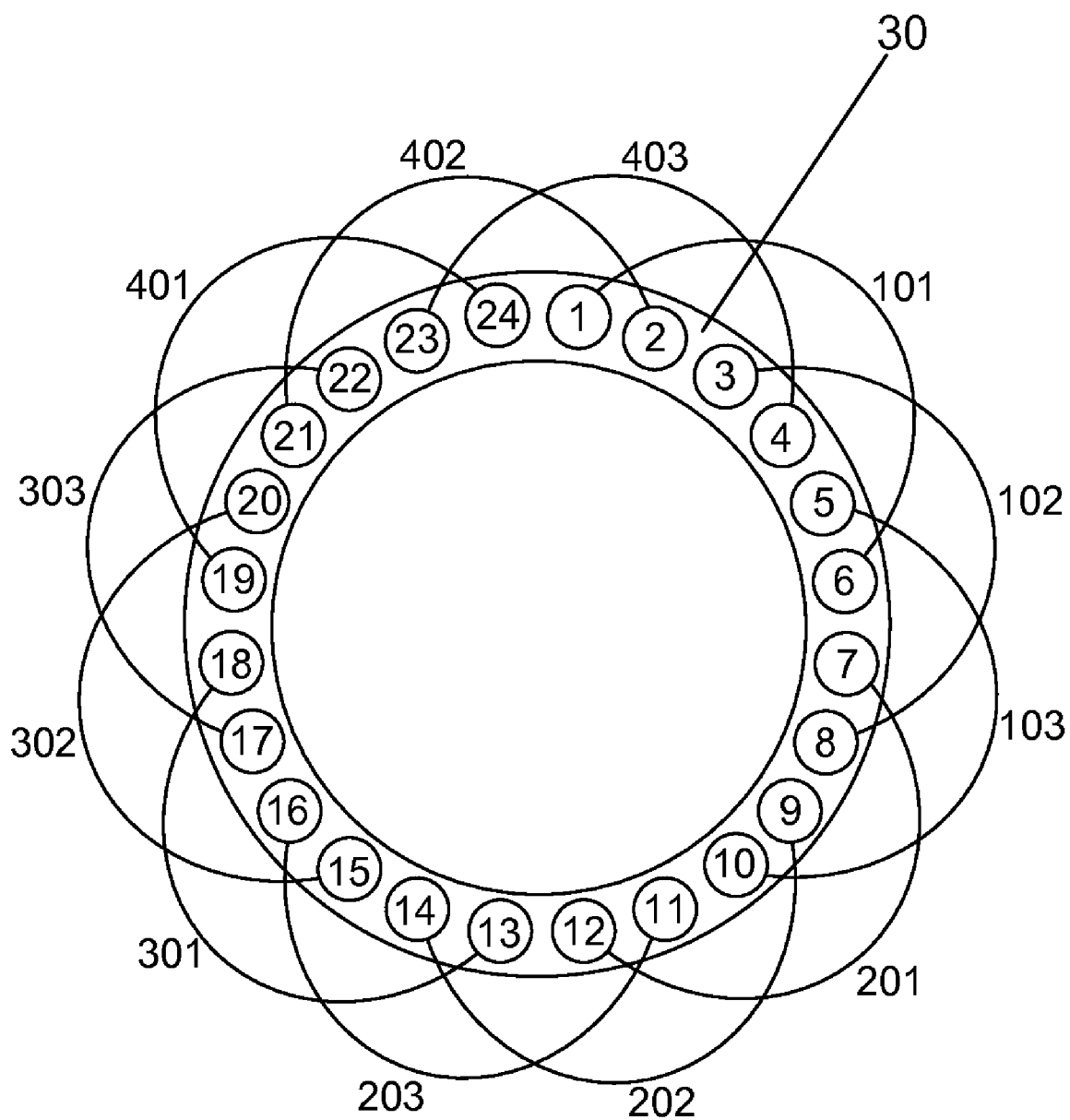
FIG. 4 is a sectional view showing a stator yoke of the reverse electromotive force generating motor according to a second embodiment of the present invention.

FIG. 4 is a sectional view showing the stator yoke 30 of the reverse electromotive force generating motor according to the second embodiment of the present invention.

In the embodiment, the coils 101 to 103, 201 to 203, 301 to 303, and 401 to 403 are arranged in the slots 1 to 24 as follows. The coil 101 is disposed in the slots 1 and 6, and is connected to an input line of a first phase. The coil 301 is disposed in the slots 13 and 18, and is connected to the coil 101 in series. The coil 201 is disposed in the slots 7 and 12, and is connected to a neutral point. The coil 401 is disposed in the slots 19 and 24, and is connected an output line of the first phase. The coil 401 is connected to the coil 201 in series.

In the embodiment, the coil 102 is disposed in the slots 3 and 8, and is connected to an input line of a second phase. The coil 302 is disposed in the slots 15 and 20, and is connected to the coil 102 in series. The coil 202 is disposed in the slots 9 and 14, and is connected to a neutral point. The coil 402 is disposed in the slots 21 and 2, and is connected to the coil 202 in series. The coil 402 is connected to an output line of the second phase.

In the embodiment, the coil 103 is disposed in the slots 5 and 10, and is connected to an input line of a third phase. The coil 303 is disposed in the slots 17 and 22, and is connected to the coil 103 in series. The coil 203 is disposed in the slots 11 and 16, and is connected to a neutral point. The coil 403 is disposed in the slots 23 and 4, and is connected to the coil 203 in series. The coil 403 is connected to an output line of the third phase.

Figure 5:
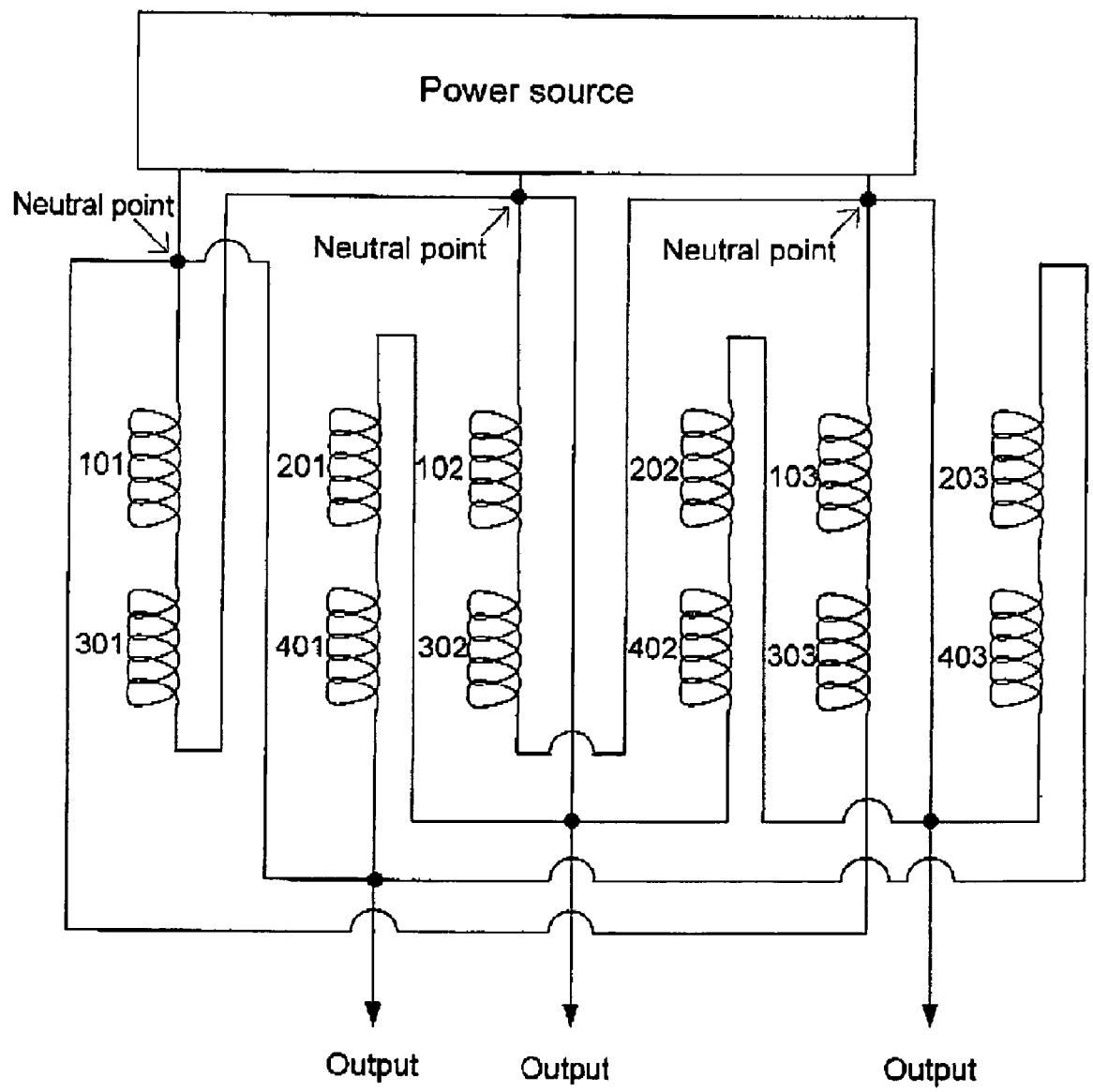
FIG. 5 is a circuit diagram of a reverse electromotive force generating motor according to the second embodiment of the present invention.

In the embodiment, the coils 101 to 103, 201 to 203, 301 to 303, and 401 to 403 are connected as follows. FIG. 5 is a circuit diagram of the reverse electromotive force generating motor according to the second embodiment of the present invention.

As shown in FIG. 5, a power source has three input lines of three phases. The input line of the first phase is connected to the coil 101, and the coil 101 is connected to the coil 301 in series. The input line of the second phase is connected to the coil 102, and the coil 102 is connected to the coil 302 in series. The input line of the third phase is connected to the coil 103, and the coil 103 is connected to the coil 303 in series. The coils 301, 302, and 303 are connected at the neutral points.

Further, in the embodiment, three output lines are connected to the neutral points. The output line of the first phase is connected to the coil 401, and the coil 201 is connected to the coil 401 in series. The output line of the second phase is connected to the coil 402, and the coil 202 is connected to the coil 402 in series. The output line of the third phase is connected to the coil 403, and the coil 203 is connected to the coil 403 in series.

Figure 11:
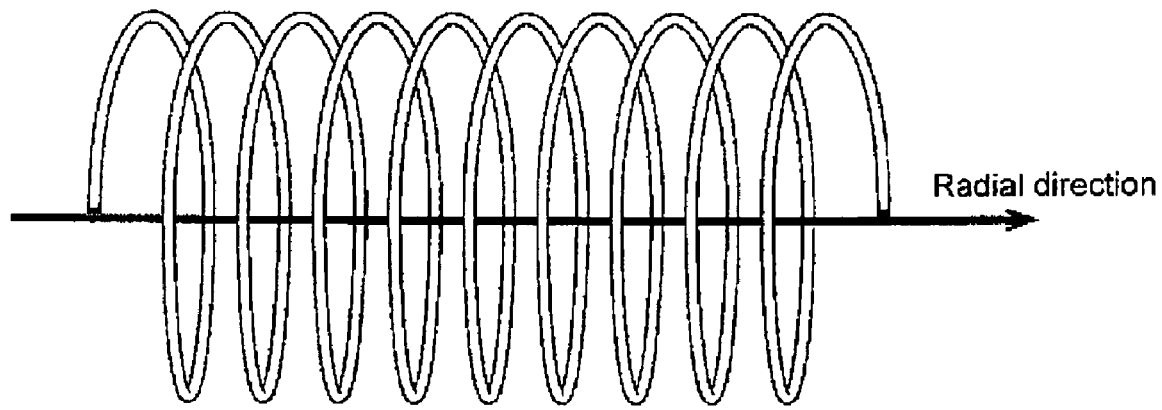
FIG. 11 is a schematic view of coils of the reverse electromotive force generating motor according to the second embodiment of the present invention.
Figure 11:
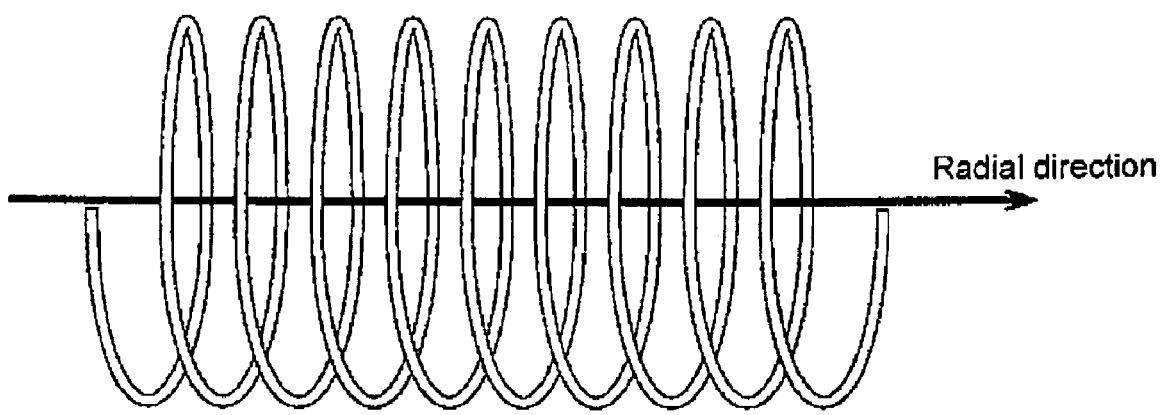

Further, in the embodiment, as shown in FIG. 11, the coils 101 to 103, 201 to 203, 301 to 303, and 401 to 403 are wound in a specific direction. More specifically, the coils 101, 201, 301, and 401 are wound in a first direction (for example, a right direction) with respect to a radial line of the stator yoke 30. Further, the coils 102, 202, 302, and 402 are wound in a second direction (for example, a left direction) with respect to the radial line of the stator yoke 30, and the second direction is opposite to the first direction. Further, the coils 103, 203, 303, and 403 are wound in the first direction (for example, the right direction) with respect to the radial line of the stator yoke 30.

An operation of the reverse electromotive force generating motor in the second embodiment is similar to that in the first embodiment, and a detailed explanation thereof is omitted.

Third Embodiment

Figure 6:
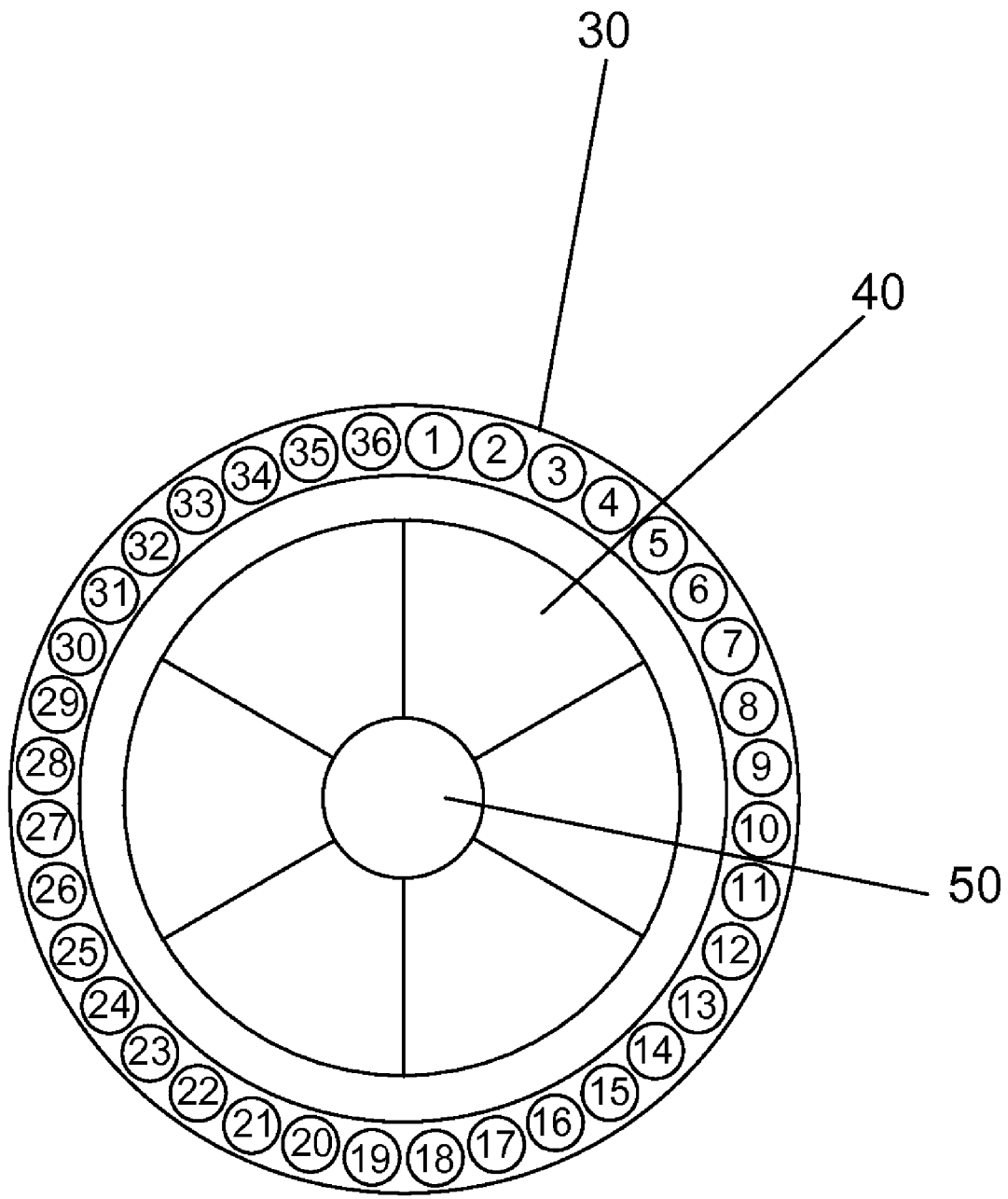
FIG. 6 is a sectional view showing a reverse electromotive force generating motor according to a third embodiment of the present invention.

A third embodiment of the present invention will be explained next. FIG. 6 is a sectional view showing a reverse electromotive force generating motor according to the third embodiment of the present invention.

As shown in FIG. 6, the reverse electromotive force generating motor includes the stator yoke 30; the rotor 40 disposed in the stator yoke 30; and the rotational shaft 50 disposed in the rotor 40. In the embodiment, the stator yoke 30 is a six-pole type. When the stator yoke 30 is the six-pole type, the stator yoke 30 may have thirty six slots or seventy two slots (the stator yoke 30 has thirty six slots in FIG. 6).

As shown in FIG. 6, the stator yoke 30 has a plurality of slots 1 to 36 (thirty six slots in the embodiment) as hollow portions. A plurality of coils 101 to 103, 201 to 203, 301 to 303, 401 to 403, 501 to 503, and 601 to 603 (described later) is arranged in the slots 1 to 36 for generating an electromotive force around the stator yoke 30, so that the rotor 40 is attracted and rotates around the rotational shaft 50.

Figure 7:
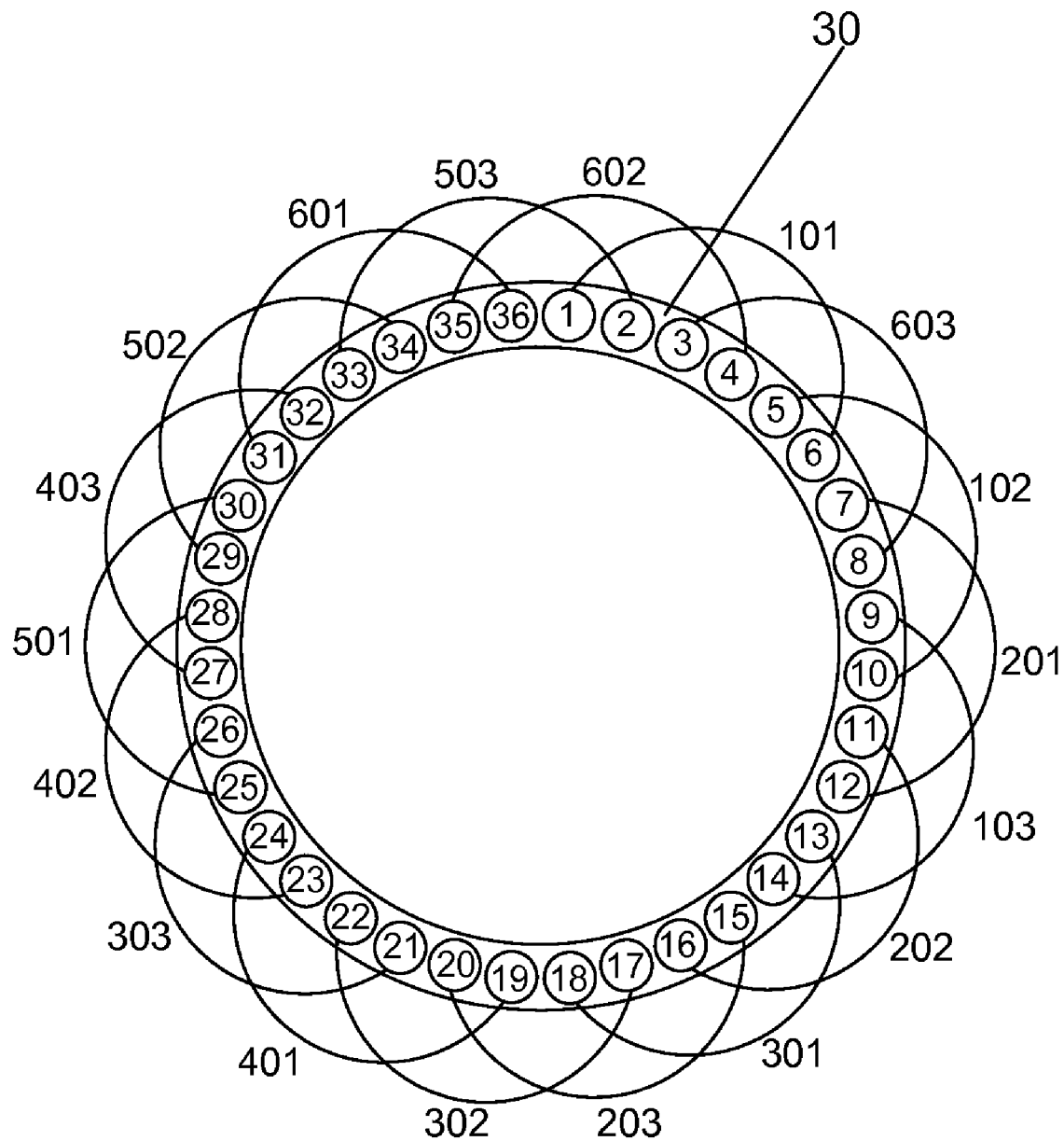
FIG. 7 is a sectional view showing a stator yoke of thee reverse electromotive force generating motor according to the third embodiment of the present invention.

FIG. 7 is a sectional view showing the stator yoke 30 of the reverse electromotive force generating motor according to the third embodiment of the present invention. The stator yoke 30 is a six-pole type, and an arrangement of the coils 101 to 103, 201 to 203, 301 to 303, 401 to 403, 501 to 503, and 601 to 603 will be explained below.

As shown in FIG. 7, the stator yoke 30 is the six-pole type, and has the thirty six slots for winding the coils 101 to 103, 201 to 203, 301 to 303, 401 to 403, 501 to 503, and 601 to 603.

In the embodiment, the coils 101 to 103, 201 to 203, 301 to 303, 401 to 403, 501 to 503, and 601 to 603 are arranged in the slots 1 to 36 as follows. The coil 101 is disposed in the slots 1 and 6, and is connected to an input line of a first phase. The coil 501 is disposed in the slots 25 and 30, and is connected to the coil 101 in series. The coil 301 is disposed in the slots 13 and 18, and is connected to the coil 501 in series. The coil 201 is disposed in the slots 7 and 12, and is connected to a neutral point. The coil 601 is disposed in the slots 31 and 36, and is connected to the coil 201 in series. The coil 401 is disposed in the slots 19 and 24, and is connected to the coil 601 in series.

In the embodiment, the coil 102 is disposed in the slots 5 and 10, and is connected to an input line of a second phase. The coil 302 is disposed in the slots 17 and 22, and is connected to the coil 102 in series. The coil 502 is disposed in the slots 29 and 34, and is connected to the coil 302 in series. The coil 202 is disposed in the slots 11 and 16, and is connected to an output line of the second phase. The coil 402 is disposed in the slots 23 and 28, and is connected to the coil 202 in series. The coil 602 is disposed in the slots 4 and 35, and is connected to the coil 402 in series.

In the embodiment, the coil 103 is disposed in the slots 9 and 14, and is connected to an input line of a third phase. The coil 503 is disposed in the slots 2 and 33, and is connected to the coil 103 in series. The coil 303 is disposed in the slots 21 and 26, and is connected to the coil 503 in series. The coil 203 is disposed in the slots 15 and 20, and is connected to an output line of the third phase. The coil 603 is disposed in the slots 3 and 8, and is connected to the coil 203 in series. The coil 403 is disposed in the slots 27 and 32, and is connected to the coil 603 in series.

Figure 8:
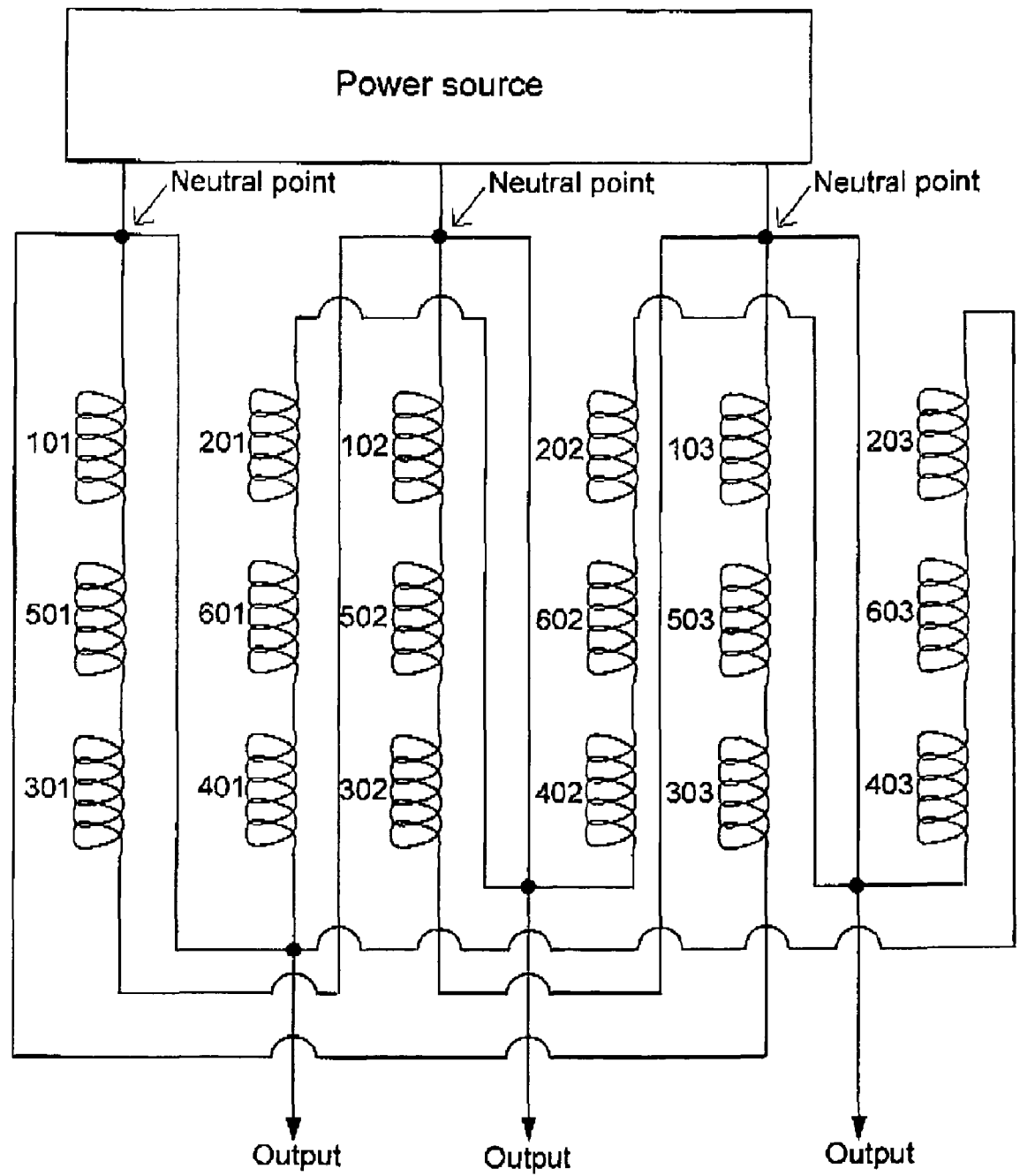
FIG. 8 is a circuit diagram of a reverse electromotive force generating motor according to the third embodiment of the present invention.

In the embodiment, the coils 101 to 103, 201 to 203, 301 to 303, 401 to 403, 501 to 503, and 601 to 603 are connected as follows. FIG. 8 is a circuit diagram of the reverse electromotive force generating motor according to the third embodiment of the present invention.

As shown in FIG. 8, a power source has three input lines of three phases. The input line of the first phase is connected to the coil 101, and the coil 101 is connected to the coils 501 and 301 in series. The input line of the second phase is connected to the coil 102, and the coil 102 is connected to the coils 302 and 502 in series. The input line of the third phase is connected to the coil 103, and the coil 103 is connected to the coils 503 and 303 in series.

In the embodiment, the coil 301 is connected to the coil 102 at the neutral point. Similarly, the coil 502 is connected to the coil 103 at the neutral point, and the coil 303 is connected to the coil 101 at the neutral point. In other words, in the embodiment, there are three neutral points.

Further, in the embodiment, the output line of the first phase is connected to the coil 401, and the coil 401 is connected to the coils 601 and 201 in series. The output line of the second phase is connected to the coil 402, and the coil 402 is connected to the coils 602 and 202 in series. The output line of the third phase is connected to the coil 403, and the coil 403 is connected to the coils 603 and 203 in series.

Further, in the embodiment, the coils 101 to 103, 201 to 203, 301 to 303, 401 to 403, 501 to 503, and 601 to 603 are wound in a same direction with respect to a radial line of the stator yoke 30. With the configuration described above, it is possible to obtain a strong initial torque.

Fourth Embodiment

A fourth embodiment of the present invention will be explained next. In the fourth embodiment, the reverse electromotive force generating motor includes the stator yoke 30; the rotor 40 disposed in the stator yoke 30; and the rotational shaft 50 disposed in the rotor 40 as shown in FIG. 6.

Figure 9:
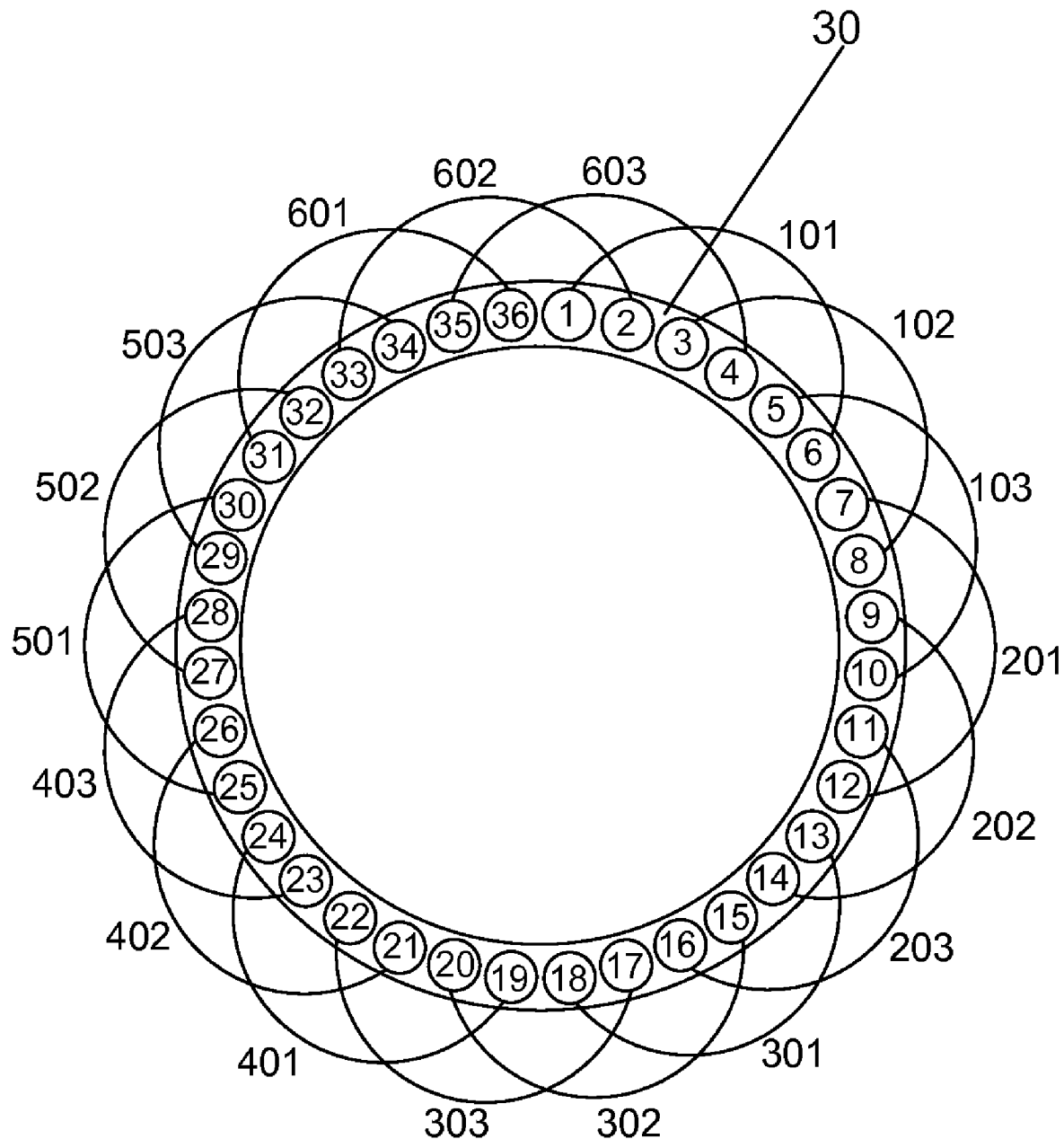
FIG. 9 is a sectional view showing a stator yoke of a reverse electromotive force generating motor according to a fourth embodiment of the present invention.

FIG. 9 is a sectional view showing the stator yoke 30 of the reverse electromotive force generating motor according to the fourth embodiment of the present invention. The stator yoke 30 is a six-pole type, and an arrangement of the coils 101 to 103, 201 to 203, 301 to 303, 401 to 403, 501 to 503, and 601 to 603 will be explained below.

As shown in FIG. 9, the stator yoke 30 is the six-pole type, and has the thirty six slots for winding the coils 101 to 103, 201 to 203, 301 to 303, 401 to 403, 501 to 503, and 601 to 603.

In the embodiment, the coils 101 to 103, 201 to 203, 301 to 303, 401 to 403, 501 to 503, and 601 to 603 are arranged in the slots 1 to 36 as follows. The coil 101 is disposed in the slots 1 and 6, and is connected to an input line of a first phase. The coil 301 is disposed in the slots 13 and 18, and is connected to the coil 101 in series. The coil 501 is disposed in the slots 25 and 30, and is connected to the coil 301 in series. The coil 201 is disposed in the slots 7 and 12, and is connected to a neutral point. The coil 601 is disposed in the slots 31 and 36, and is connected to an output line of the first phase. The coil 401 is disposed in the slots 19 and 24, and is connected to the coil 601 in series.

In the embodiment, the coil 102 is disposed in the slots 3 and 8, and is connected to an input line of a second phase. The coil 502 is disposed in the slots 27 and 32, and is connected to the coil 102 in series. The coil 302 is disposed in the slots 15 and 20, and is connected to the coil 502 in series. The coil 202 is disposed in the slots 9 and 14, and is connected to a neutral point. The coil 402 is disposed in the slots 21 and 26, and is connected to an output line of the second phase. The coil 602 is disposed in the slots 33 and 2, and is connected to the coil 402 in series.

In the embodiment, the coil 103 is disposed in the slots 5 and 10, and is connected to an input line of a third phase. The coil 303 is disposed in the slots 17 and 22, and is connected to the coil 103 in series. The coil 503 is disposed in the slots 29 and 34, and is connected to the coil 303 in series. The coil 203 is disposed in the slots 11 and 16, and is connected to a neutral point. The coil 603 is disposed in the slots 35 and 4, and is connected to an output line of the third phase. The coil 403 is disposed in the slots 23 and 28, and is connected to the coils 203 and 603 in series.

Figure 10:
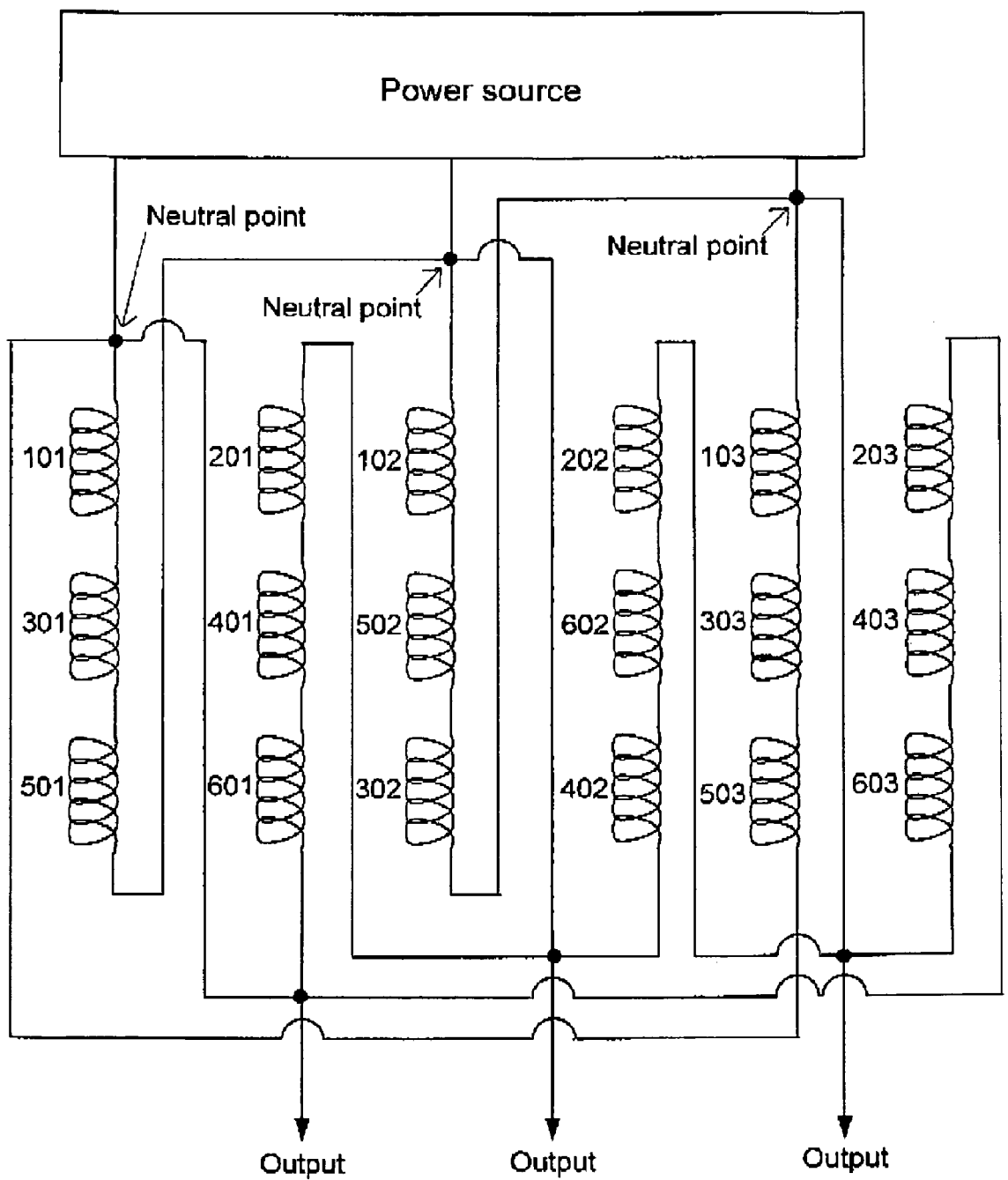
FIG. 10 is a circuit diagram of the reverse electromotive force generating motor according to the fourth embodiment of the present invention.

In the embodiment, the coils 101 to 103, 201 to 203, 301 to 303, 401 to 403, 501 to 503, and 601 to 603 are connected as follows. FIG. 10 is a circuit diagram of a reverse electromotive force generating motor according to the fourth embodiment of the present invention.

As shown in FIG. 10, a power source has three input lines of three phases. The input line of the first phase is connected to the coil 101, and the coil 101 is connected to the coils 301 and 501 in series. The input line of the second phase is connected to the coil 102, and the coil 102 is connected to the coils 502 and 302 in series. The input line of the third phase is connected to the coil 103, and the coil 103 is connected to the coils 303 and 503 in series.

In the embodiment, the coil 501 is connected to the coil 102 at the neutral point. Similarly, the coil 302 is connected to the coil 103 at the neutral point, and the coil 503 is connected to the coil 101 at the neutral point. In other words, in the embodiment, there are three neutral points D.

Further, in the embodiment, the output line of the first phase is connected to the coil 601, and the coil 601 is connected to the coils 401 and 201 in series. The output line of the second phase is connected to the coil 602, and the coil 602 is connected to the coils 602 and 202 in series. The output line of the third phase is connected to the coil 603, and the coil 603 is connected to the coils 403 and 203 in series.

Figure 12:
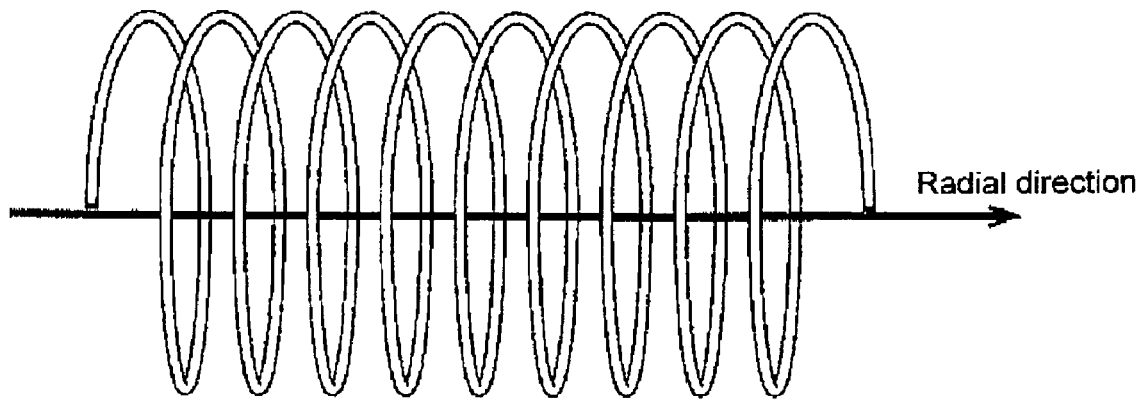
FIG. 12 is a schematic view of coils of the reverse electromotive force generating motor according to the fourth embodiment of the present invention.
Figure 12:
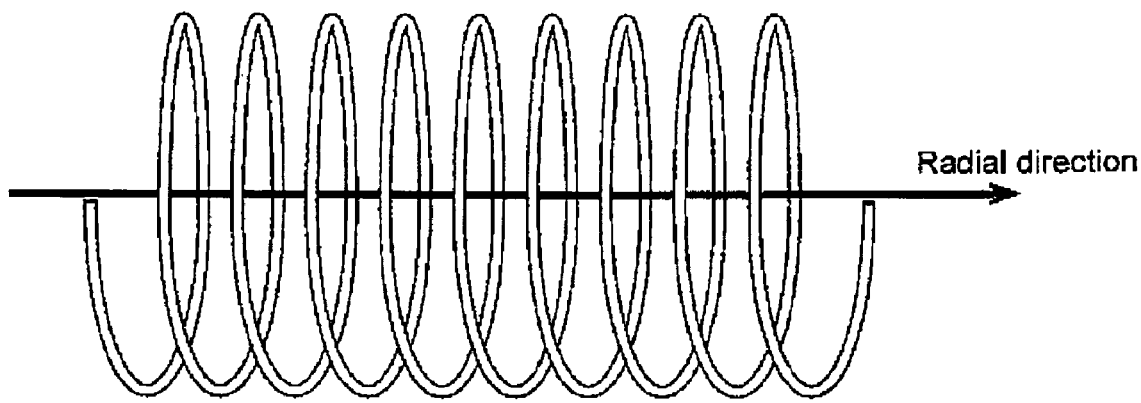

Further, in the embodiment, as shown in FIG. 12, the coils 101 to 103, 201 to 203, 301 to 303, 401 to 403, 501 to 503, and 601 to 603 are wound in a specific direction. More specifically, the coils 101, 201, 301, 401, 501, and 601 are wound in a first direction (for example, a left direction) with respect to a radial line of the stator yoke 30. Further, the coils 102, 202, 302, 402, 502, and 602 are wound in a second direction (for example, a right direction) with respect to the radial line of the stator yoke 30, and the second direction is opposite to the first direction. Further, the coils 103, 203, 303, 403, 503, and 603 are wound in the first direction (for example, the left direction) with respect to the radial line of the stator yoke 30.

With the configuration described above, it is possible to obtain a strong initial torque.

The disclosure of Japanese Patent Application No. 2010-021688, filed on Feb. 2, 2010 is incorporated in the application by reference.

While the invention has been explained with reference to the specific embodiments of the invention, the explanation is illustrative and the invention is limited only by the appended claims.

What is claimed is:

1. A reverse electromotive force generating motor, comprising:
    a stator yoke;
    a rotor disposed in the stator yoke;
    a first coil disposed in the stator yoke and connected to a first input line of a power source with a first phase;
    a second coil disposed in the stator yoke and connected to the first coil in series, said second coil being connected to a first neutral point;
    a third coil disposed in the stator yoke and connected to the first neutral point;
    a fourth coil disposed in the stator yoke and connected to the third coil in series, said fourth coil being connected to a first output line for outputting power;
    a fifth coil disposed in the stator yoke and connected to a second input line of the power source with a second phase;
    a sixth coil disposed in the stator yoke and connected to the fifth coil in series, said sixth coil being connected to a second neutral point;
    a seventh coil disposed in the stator yoke and connected to the second neutral point;
    an eighth coil disposed in the stator yoke and connected to the seventh coil in series, said eighth coil being connected to a second output line for outputting power; and
    a rotational shaft disposed in the rotor,
    wherein said first to fourth coils are wound in a first direction with respect to a radial line of the stator yoke, said fifth to eighth coils being wound in a second direction opposite to the first direction.

2. The reverse electromotive force generating motor, according to claim 1, further comprising a fifteenth coil disposed between the fifth coil and the sixth coil, in series, and a sixteenth coil disposed between the seventh coil and the eighth coil in series.

3. The reverse electromotive force generating motor according to claim 2, wherein said thirteenth coil and fourteenth coils are wound in a first direction with respect to a radial line of the stator yoke, said fifteenth coil and sixteenth coil being wound in a second direction opposite to the first direction.

4. The reverse electromotive force generating motor according to claim 1, further comprising a ninth coil disposed in the stator yoke and connected to a third input line of the power source with a third phase; a tenth coil disposed in the stator yoke and connected to the ninth coil in series, said tenth coil being connected to a third neutral point; an eleventh coil disposed in the stator yoke and connected to the third neutral point; and a twelfth coil disposed in the stator yoke and connected to the eleventh coil in series, said twelfth coil being connected to a third output line for outputting power.

5. The reverse electromotive force generating motor according to claim 4, wherein said first to fourth coils and ninth to twelfth coils are wound in a first direction with respect to a radial line of the stator yoke, said fifth to eighth coils being wound in a second direction opposite to the first direction.

6. The reverse electromotive force generating motor according to claim 4, further comprising a seventeenth coil disposed between the ninth coil and the tenth coil in series, and an eighteenth coil disposed between the eleventh coil and the twelfth coil in series.

7. The reverse electromotive force generating motor according to claim 4, wherein said fifth coil is arranged in only two of the slots with four slots in between to overlap with the ninth coil in the state yoke,
    said sixth coil is arranged, in only two of the slots with four slots in between to overlap with the tenth coil in the state yoke,
    said seventh coil is arranged in only two of the slots with four slots in between to overlap with the eleventh coil in the state yoke, and
    said eighth coil is arranged in only two of the slots with four slots in between to overlap with the twelfth coil in the state yoke.

8. The reverse electromotive force generating motor according to claim 1, further comprising a thirteenth coil disposed between the first coil and the second coil in series, and a fourteenth coil disposed between the third coil and the fourth coil in series.

9. The reverse electromotive force generating motor according to claim 1, wherein said rotor is formed of a permanent magnet.

10. The reverse electromotive force generating motor according to claim 1, wherein said rotor is formed of an iron core.

11. The reverse electromotive force generating motor according to claim 1, wherein said first coil is arranged in only two of the slots with four slots in between to overlap with the fifth coil in the state yoke,
    said second coil is arranged in only two of the slots with four slots in between to overlap with the sixth coil in the state yoke,
    said third coil is arranged in only two of the slots with four slots in between to overlap with the seventh coil in the state yoke, and
    said fourth coil is arranged in only two of the slots with four slots in between to overlap with the eighth coil in the state yoke.

* * * * *